Dec. 14, 1926.
J. BLAND
SCREEN
Filed June 1, 1925
1,610,353
3 Sheets-Sheet 1
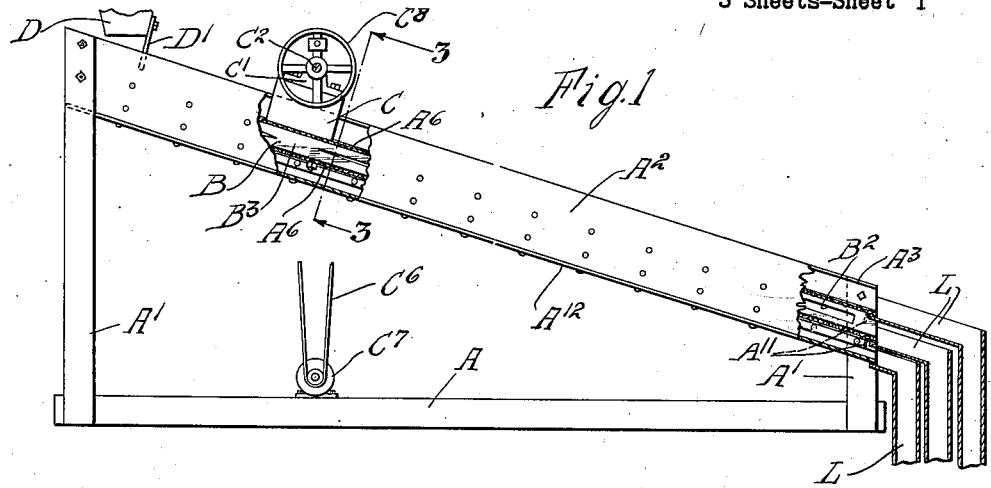
Fig.1
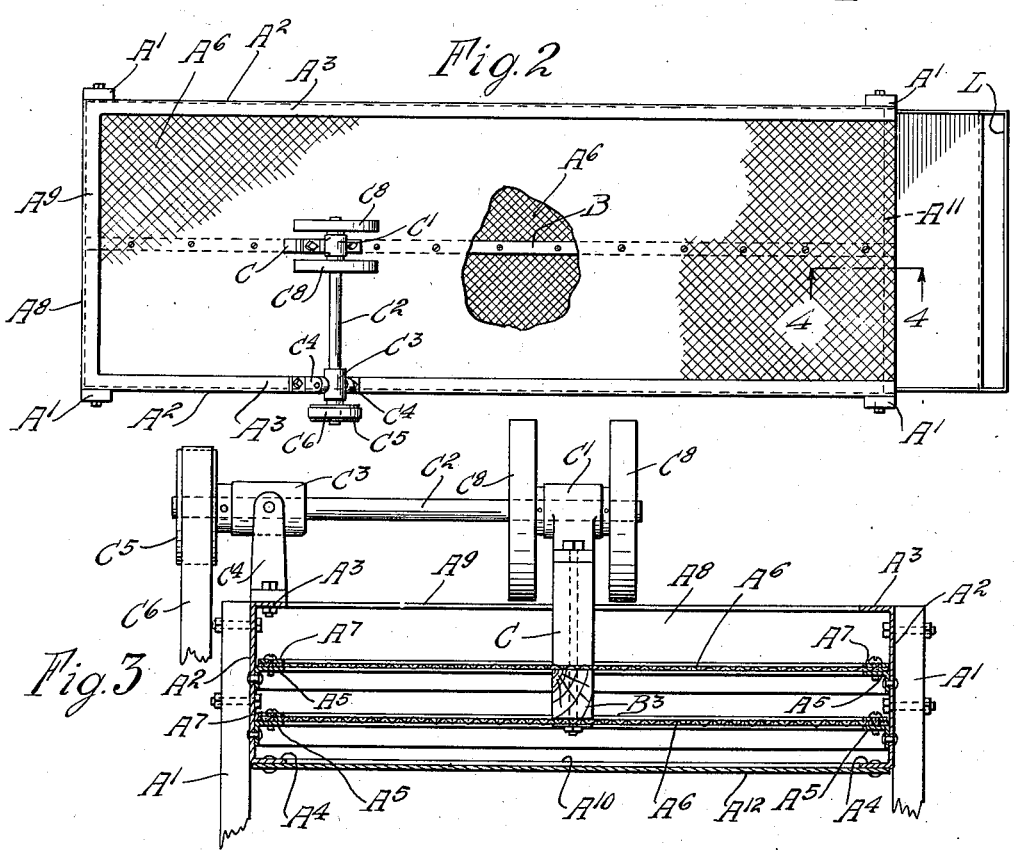
Fig.2
Fig.3
Inventor.
John Bland
by Parker & Carter,
Attorneys.

Dec. 14, 1926.                                                    1,610,353
J. BLAND
SCREEN
Filed June 1, 1925                    3 Sheets-Sheet 2
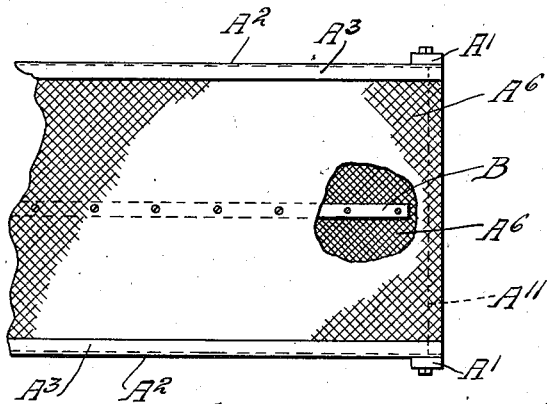
Fig. 5
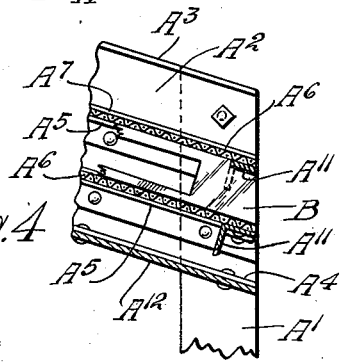
Fig. 4
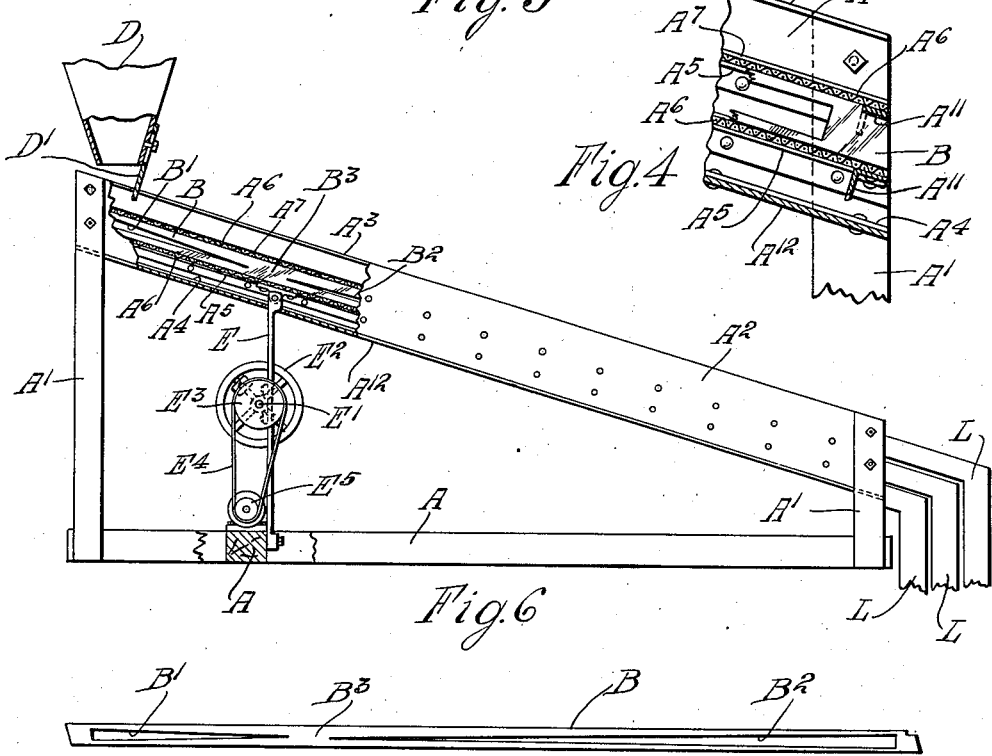
Fig. 6
Fig. 7
Inventor
John Bland
by Parker & Carter
Attorneys.

Dec. 14, 1926.

J. BLAND 1,610,353

SCREEN
Filed June 1, 1925

Inventor.
John Bland
by Parker & Carter
Attorneys.

Patented Dec. 14, 1926.

1,610,353

UNITED STATES PATENT OFFICE.

JOHN BLAND, OF CHICAGO, ILLINOIS.

SCREEN.

REISSUED

Application filed June 1, 1925. Serial No. 33,876.

This invention relates to a vibratory screen and particularly to the vibratory elements by means of which the screen is vibrated. It has for one object to provide an apparatus for setting up in a screen an extremely rapid vibration having a wide amplitude. Another object is to provide a spring element for use in connection with a screen which will serve to give a substantially constant degree of vibration throughout the length of the screen. Other objects will appear from time to time throughout the specification and claims.

My invention is illustrated more or less diagrammatically in the accompanying drawings, wherein:

Figure 1 is a side elevation of the preferred form of screen with parts in section and parts broken away;

Figure 2 is a plan view of the screen shown in Figure 1 with parts broken away;

Figure 3 is a transverse cross section on an enlarged scale taken on line 3—3 of Figure 1;

Figure 4 is an enlarged longitudinal fragmentary cross section of the end of the screen taken on line 4—4 of Figure 2;

Figure 5 is a plan view with parts broken away showing a modified form of spring mounting;

Figure 6 is a side elevation with parts broken away and parts in section, showing a modified form of vibratory element;

Figure 7 is a side elevation of one of the spring elements;

Like parts are indicated by like characters throughout.

Figure 8:
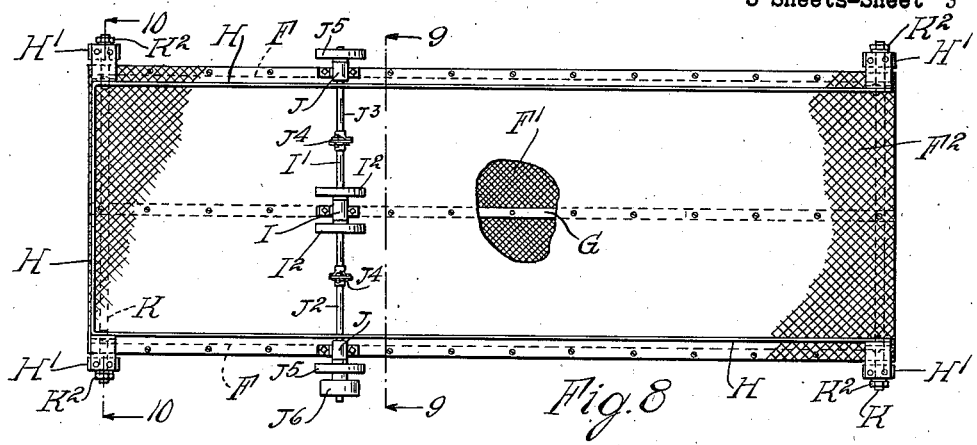
Figure 8 is a plan view of a modified form of the invention in which the screen is vibrated at its edges as well as along its center.

A is a foundation or bottom member for a screen. $A^1$ $A^1$ are uprights which support the screen from the foundation member A. $A^2$ $A^2$ are side frame members of the screen. They are provided with inwardly extending flanges $A^3$ at their upper edges, and similar flanges $A^4$ at their lower edges. They are provided intermediate their lower and upper edges with inwardly extending angle members $A^5$ $A^5$ to which screen cloth sections $A^6$ $A^6$ are fastened. The edges of the screen cloth sections are held down to the flanges $A^5$ by means of retaining strips $A^7$. They may be bolted or riveted in the position shown particularly in Figure 3. $A^8$ is the end member of the frame similar to the side members and provided with an upper flange $A^9$ and a lower flange $A^{10}$, and intermediate flanges similar to the flanges $A^5$ of the side sections to which the ends of the screen cloth are fastened.

The lower end of the screen frame is open to permit discharge of the material which runs off the screen. It is provided with one or more flat members $A^{11}$ which serve to support the screen cloth sections and join the side members. $A^{12}$ is a bottom plate fastened to the screen frame, preferably to the lower flanges of the side and end frame members.

B is a spring member. It is mounted between the upper and lower screening surfaces. It is preferably made of wood, although it might be made of other material. It is preferably provided with a pair of generally triangular slots $B^1$ $B^2$ cut through it and having their wide ends near the ends of the spring member and their narrow or pointed ends extending toward each other and toward the solid portion $B^3$.

Above the solid portion $B^3$ is preferably mounted in the form shown specifically in Figures 1, 2 and 3, the block C. Upon this is mounted a bearing $C^1$ which carries one end of a shaft $C^2$, the other end of which is mounted in a bearing $C^3$ and pivotally supported between the members $C^4$. The outer end of the shaft carries a driving pulley $C^5$ by means of which it is rotated about a belt $C^6$ by a motor $C^7$ or any other suitable power source. Mounted on the shaft $C^2$ is one or more out-of-balance fly wheels $C^8$ $C^8$.

D is a feed hopper into which material is fed and from the bottom of which it is discharged upon the upper surface of the screen. It is provided with an adjustable valve plate $D^1$ which may be moved up or down with relation to the hopper to vary the space between its lower edge and the upper surface of the screen and thereby to vary the thickness of the sheet of material which can be discharged upon the upper surface of the screen.

As shown in the first four figures both ends of the spring members B are fastened to the frame which holds the screen structure generally. As shown in Figure 5, however, the spring member B is not fastened to the end of the frame. This figure shows it free from the lower end of the screen frame and supported only between the upper and lower screen sections. For some purposes it has been found desirable to fasten this screen member at each end and for other purposes to leave it free at either end or both ends, and Figure 5 is intended to illustrate this form. Only one end is shown because the other end, if left free, is the same as the end shown in Figure 5.

As shown in Figure 6 the vibratory element is of a different design. Instead of mounting the out-of-balance shaft directly on the spring member B at the solid portion $B^3$, it is mounted upon a vertical member spring E. Thus a spring member E is provided which is fixed at its lower end upon a part of the foundation A. At its upper end it is fastened to the spring B beneath the solid parts $B^3$ upon which is mounted in suitable bearings a shaft $E^1$ which carries one or more out-of-balance fly wheels $E^2$ and a driving pulley $E^3$, through which by means of a belt $E^4$ the shaft may be rotated from a motor $E^5$ or any other suitable power source.

Figure 9:
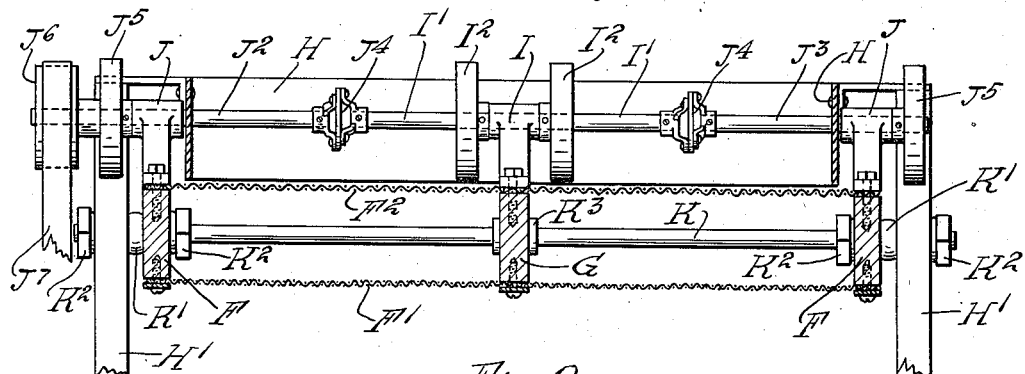
Figure 9 is a transverse cross section on an enlarged scale, taken on the line 9—9 of Figure 8.
Figure 10:
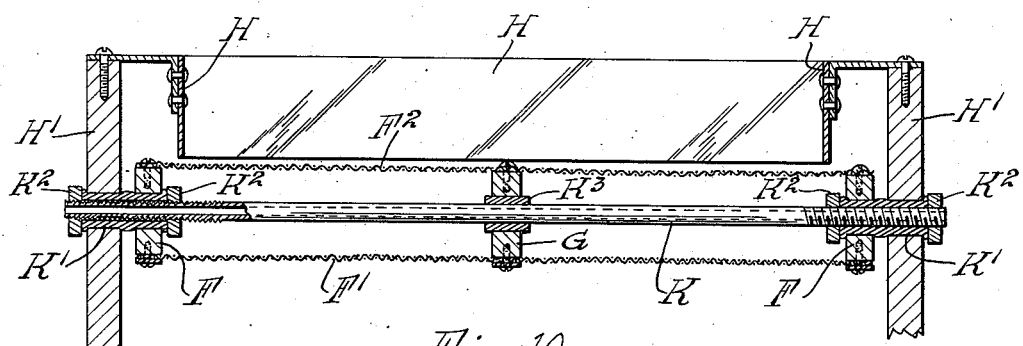
Figure 10 is a similar cross section taken on line 10—10 of Figure 8.

In Figures 8, 9, and 10 a further modified form is shown. As shown in this form there is provided a pair of side spring frame members F F. The screen sections $F^1$ $F^2$ are mounted above and below these side members.

Running between the screen sections and generally parallel to the side members F is a spring member G which is the same as the spring member B shown in the earlier figures and described in connection with them.

Surrounding the upper surface of the screen on its side and upper end is a material retaining frame work H. It is preferably out of contact with the upper screen surface but approaches it closely, surrounding it except at the lower end and prevents spilling of material from the sides. This framework is supported upon members $H^1$ which at their upper ends carry the framework and at their lower ends are fastened to a foundation or any other suitable support. The screen is open at its lower end to permit discharge of material.

I is a bearing mounted upon the spring G and carrying a shaft $I^1$ which carries one or more out-of-balance rotors $I^2$.

J J are bearings mounted one upon each of the side members F, carrying respectively shafts $J^2$ $J^3$, each of said shafts being joined at its inner end to the shaft $I^1$ by a flexible joint $J^4$. Each of said shafts carries adjacent its outer end an out-of-balance rotor $J^5$. The shaft $J^2$ carries in addition at its outer end a driving pulley $J^6$ which is rotated by a belt $J^7$ from any suitable power source.

At their ends the side frame members F are joined and held in proper spaced relation by means of tie rods K. Each of the tie rods passes through the side spring members F, the central spring member G and the frame supporting members $H^1$. Each of said tie rods is provided adjacent its outer end with a rubber or other flexible bushing $K^1$, and through each of said bushings it is provided with nuts $K^2$. These nuts are screwed toward each other and the rubber bushings are thereby placed under compression and bulge out slightly at their ends and adjacent their centers as is shown, and thereby properly place the spring elements F with relation to the supporting members $H^1$ and prevent lateral displacement or movement of these parts. Surrounding the tie rods at the points where they pass through the spring member G and engaging that spring member are additional rubber bushings $K^3$. These serve generally the same purpose described with respect to the outer bushings.

There is provided for the screen in the first two forms a discharge receiving chute L, one chute being provided for each of the screen decks and one for the fines that pass through the lower deck. Thus three chutes are provided in all.

No such arrangement is shown for the screens illustrated in Figures 8, 9, and 10 but any suitable discharge receiving arrangement may be provided in connection with that form of the invention, and a bottom plate similar to the plate $A^{12}$ may also be provided below the lower screen $F^1$ or any other means provided for receiving material which passes through the lowest screen.

Although I have shown an operative device, still it will be obvious that many changes might be made in size, shape and arrangement of parts without departing materially from the spirit of my invention; and I wish, therefore, that my showing be taken as in a sense diagrammatic.

The use and operation of my invention are as follows:

In the form shown in Figures 1 to 5 inclusive, the parts are assembled in the position shown. The rotary element is set in rotation and because of its out-of-balance it sets up a vibration. Since the rotary element is mounted so as to act upon the central longitudinal spring B, when it is in vibration it sets up a vibration along this member, usually setting it in vibration in a wave-like motion. This sets up vibration and vibrates the two screen decks attached to the spring member.

Material to be screened is fed upon the upper deck and the screening operation takes place, the over-sized passing off at the bottom of the upper. Some of the material which passes through it, passes to the lower deck, and the material which passes through the lower screen is carried down along the bottom plate of the screen and passes off at the bottom of it.

One of the important features of this form of the invention is that the screen cloth itself is directly attached to the vibrating spring element, and thus the vibration is transmitted directly from this spring element to the screen cloth.

The action of the longitudinal spring member B is generally the same whether or not it be attached to the frame at one end or both ends. In either case a wave like vibration is set up in it and this vibration is transmitted directly to the screen cloth which is attached to this spring element.

In the form shown in Figure 6 the vibratory element instead of being mounted so as to act directly upon the longitudinal spring element is mounted upon a vertical spring element. This element is fixed at its bottom end and at its top is attached to the longitudinal spring element B. Rotation of the out-of-balance rotor causes lateral bending movement of the vertical spring member E. As this member is bent laterally, and since it is held against pivotal movement at its ends, its vertical height is shortened. This periodical shortening of the vertical spring member due to rotation of the out-of-balance rotor sets up vertical movement at the upper end of the spring member. This being attached to the longitudinal spring member B imparts to it a vibratory movement and it is thus vibrated.

In the form shown in Figures 8, 9, and 10 the central longitudinal spring member is generally the same as that shown in the other figures. In addition to this, however, side longitudinal spring members are provided. These may or may not be of the same construction but they are essentially spring members. The screen cloth is directly attached above and below these three longitudinal spring members. Each of these carries a bearing which supports one or more out-of-balance rotors. When these are rotated a vibration is imparted to the longitudinal spring members, in this case the members G and F, and a wave-like vibration is set up along each of them. Thus the screen cloth which is attached to each of them is set into vibration.

The feed of material upon the forms of screen shown in Figures 6 to 10 inclusive is generally the same as that described above in connection with the other figures. It will be noted that all of the forms of the invention have in common the feature of a longitudinal spring member which is attached to the screen cloth and which is vibrated, and this imparts vibration directly to the cloth.

The stiffness of the spring member is preferably varied throughout its length so as to provide an equal degree of vibration throughout its length. For some purposes this might not be the case, but it is usually preferable so to vibrate the spring member B that the degree of vibration imparted from it to the screen cloth is substantially the same throughout the length of the screen.

I claim:

1. In a screen, a screening member and a plurality of separated spring members each attached to said screen member throughout its length, and means for vibrating said spring members including an out-of-balance rotor adapted to act directly upon said spring members.

2. In a screen, a screening member, and a spring member attached to said screening member throughout its length and means for vibrating said spring member, said spring member being of varying flexibility throughout its length so that it is flexed substantially equally throughout its length.

3. In a screen, a screening member and a plurality of spring members each attached to said screen member throughout its length, and means for vibrating said spring members, said spring members being of varying flexibility throughout their length so that they are flexed substantially equally throughout their length.

4. In a screen, a screening member and a plurality of spring members each attached to said screen member throughout its length, and means for vibrating said spring members including an out-of-balance rotor adapted to act directly upon said spring members, said spring members being of varying flexibility throughout their length so that they are flexed substantially equally throughout their length.

5. In a screen, a screening member and a frame for said member formed of members adapted to be flexed, in combination with a spring member adapted to be attached to said screen member throughout its length and means for vibrating said frame and said spring member.

6. In a screen, a screening member and a frame for said member formed of members adapted to be flexed, in combination with a spring member adapted to be attached to said screen member throughout its length and means for vibrating said frame and said spring member, said means including an out-of-balance rotor.

7. In a screen, a screening member and a frame for said member formed of members adapted to be flexed, in combination with a spring member adapted to be attached to said screen member throughout its length and means for vibrating said frame and said spring member, the flexibility of said spring member being varied throughout its length so that it is flexed substantially equally throughout its length.

8. In a screen, a screening member and a frame for said member formed of members adapted to be flexed, in combination with a spring member adapted to be attached to said screen member throughout its length and means for vibrating said frame and said spring member, said means including an out-of-balance rotor, the flexibility of said spring member being varied throughout its length so that it is flexed substantially equally throughout its length.

9. In a screen, a plurality of levels of screen cloth, a plurality of spring members attached to each of said levels of screen cloth, and means for vibrating said spring members including an out-of-balance rotor adapted to act upon each of such springs, the flexibility of such springs being varied throughout their length so that each of them is flexed substantially equally throughout its length.

10. In combination with a screen having a screening member and a frame for such member from which the same is supported, a self sustaining resilient vibrating member extending from end to end of the screen and secured to it and means for vibrating such resilient member, including an out of balance rotor adapted to act directly upon such member.

11. In combination with a screen, a plurality of screen members and a frame for such members from which they are supported, a plurality of flexible vibratory members of substantial vertical thickness interposed between such screens, the upper screen positively secured to the upper surface of such vibratory member and the lower screen secured to the lower surface of such member along substantially the entire length of such screens, means for vibrating such flexible members including a vibratory member adapted to act directly upon such flexible member.

Signed at Chicago, county of Cook and State of Illinois, this 27th day of May, 1925.

JOHN BLAND.